United States Patent
Wright et al.

(10) Patent No.: US 8,690,730 B2
(45) Date of Patent: Apr. 8, 2014

(54) METHOD FOR IMPROVING SHIFT QUALITY IN AN AUTOMATIC TRANSMISSION

(75) Inventors: David W. Wright, Howell, MI (US); Philippe Ramet, Strasbourg (FR); Morgan Postic, Osthouse (FR)

(73) Assignee: GM Global Technology Operations LLC, Detroit, MI (US)

( * ) Notice: Subject to any disclaimer, the term of this patent is extended or adjusted under 35 U.S.C. 154(b) by 363 days.

(21) Appl. No.: 13/061,335

(22) PCT Filed: Jul. 27, 2009

(86) PCT No.: PCT/EP2009/005436
§ 371 (c)(1),
(2), (4) Date: Feb. 28, 2011

(87) PCT Pub. No.: WO2010/022835
PCT Pub. Date: Mar. 4, 2010

(65) Prior Publication Data
US 2011/0154931 A1    Jun. 30, 2011

(30) Foreign Application Priority Data

Aug. 28, 2008 (GB) .................................. 0815600.2

(51) Int. Cl.
B60W 10/04    (2006.01)
(52) U.S. Cl.
USPC ......................................................... 477/107
(58) Field of Classification Search
USPC .................................. 477/115, 107; 74/473.1
See application file for complete search history.

(56) References Cited

U.S. PATENT DOCUMENTS

| 4,848,189 A | 7/1989 | Simon, Jr. et al. |
| 5,241,477 A | 8/1993 | Narita |
| 2009/0198423 A1* | 8/2009 | Tissot et al. ..................... 701/55 |

FOREIGN PATENT DOCUMENTS

| EP | 0520530 A1 | 12/1992 |
| EP | 1547849 A1 | 6/2005 |
| EP | 2085658 A1 | 8/2009 |
| GB | 2239065 A | 6/1991 |

OTHER PUBLICATIONS

International Searching Authority, PCT International Search Report for PCT Application No. PCT/EP2009/005436, Oct. 21, 2009.

* cited by examiner

*Primary Examiner* — David D Le
*Assistant Examiner* — David J Hlavka
(74) *Attorney, Agent, or Firm* — Ingrassia Fisher & Lorenz, P.C.

(57) ABSTRACT

A method is provided for improving shift quality in an automatic transmission. In many automatic transmissions, the shift quality during lift foot upshifts is unsatisfying. Generally, two types of complaints concerning shift quality are known: harsh feel right after the shift order and bump at the synchronization of the shift. In order to provide an automatic transmission which overcomes these two problems, a first and a second positive torque requests are initiated on upshift coasts. This measure improves the global shift feel by controlling the engine toque level at shift order and at synchronization: the engine torque level at the beginning of the gear shift is smoothly decreased to reduce the initial bump and is controlled at the synchronization to reduce the amplitude of underlap when the clutch capacity is rising.

10 Claims, 3 Drawing Sheets

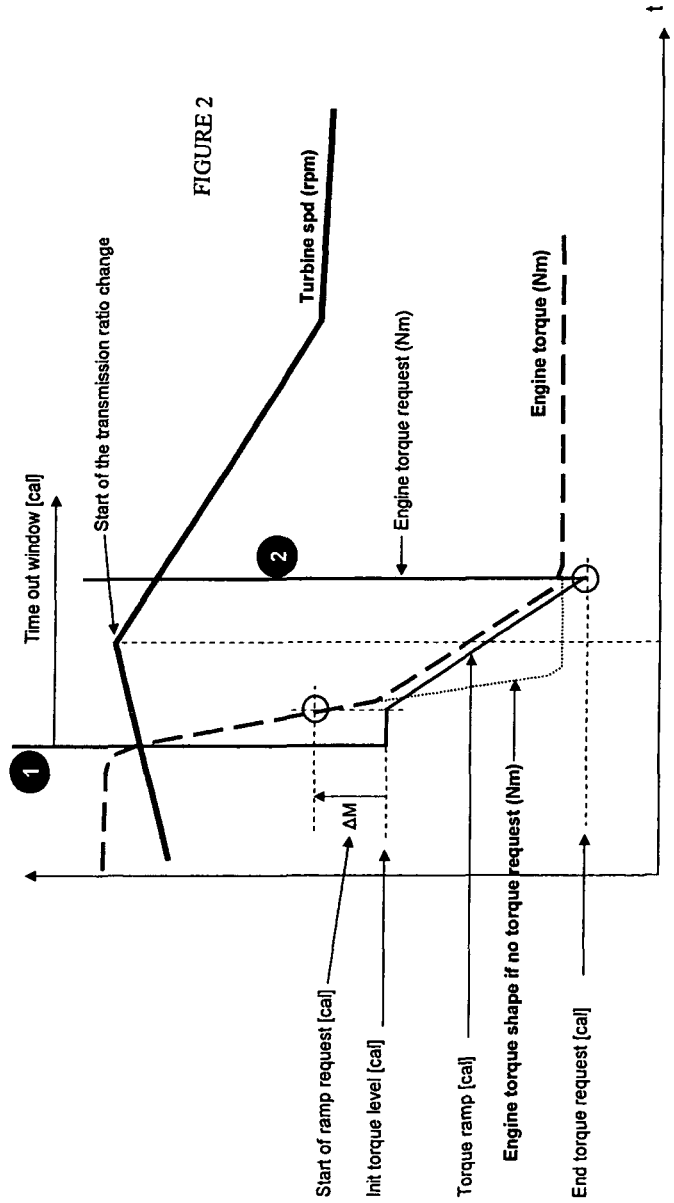

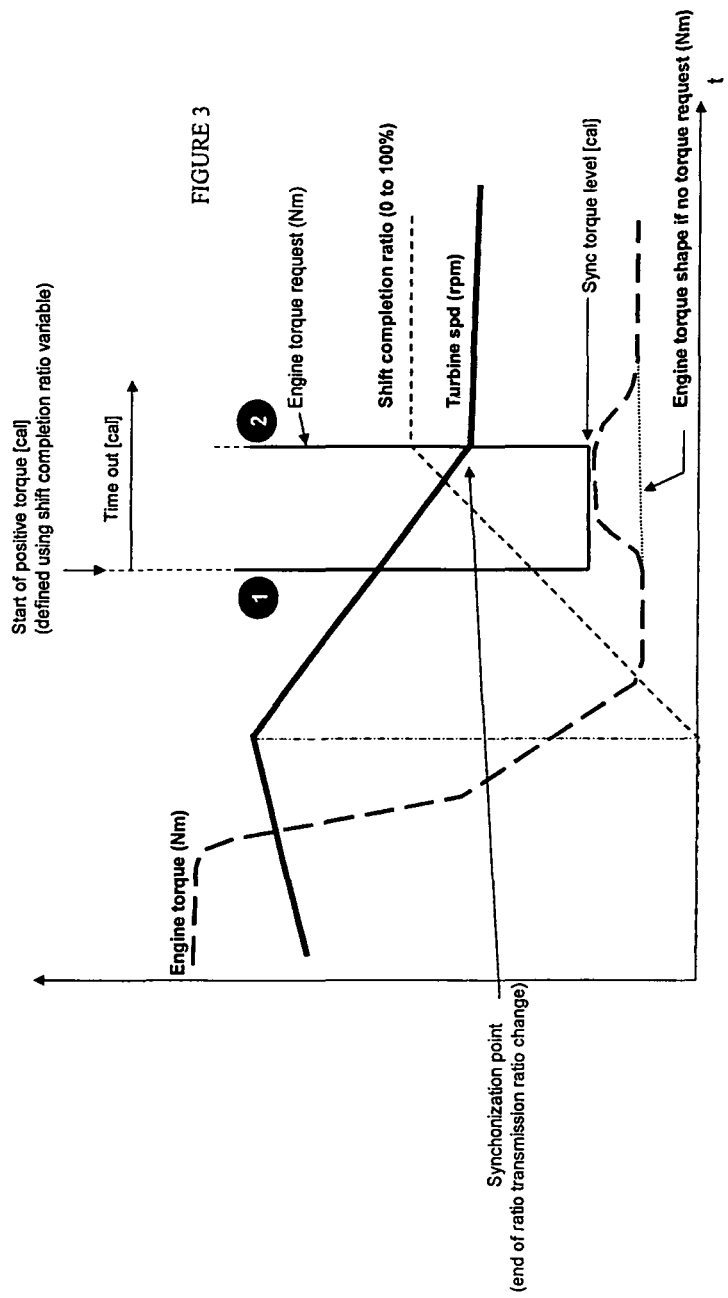

METHOD FOR IMPROVING SHIFT QUALITY IN AN AUTOMATIC TRANSMISSION

CROSS-REFERENCE TO RELATED APPLICATIONS

This application is a U.S. National-Stage entry under 35 U.S.C. §371 based on International Application No. PCT/EP2009/005436, filed Jul. 27, 2009, which was published under PCT Article 21(2) and which claims priority to British Application No. 0815600.2, filed Aug. 28, 2008, which are all hereby incorporated in their entirety by reference.

TECHNICAL FIELD

The technical field relates to a method for improving shift quality in an automatic transmission. It also concerns an automatic transmission.

BACKGROUND

In many automatic transmissions, the shift quality during lift foot upshifts is unsatisfying. Generally, two types of complaints concerning shift quality are known: harsh feel right after the shift order and bump at the synchronization of the shift.

It is therefore at last one objective to provide an automatic transmission which overcomes these two problems. In addition, other objectives, desirable features and characteristics will become apparent from the subsequent summary and detailed description, and the appended claims, taken in conjunction with the accompanying drawings and this background.

SUMMARY

According to embodiments of the present invention, this at least one objective is achieved in that a first and a second positive torque requests are initiated during upshift in coast condition. This measure improves both the initial shift feel as well as the end feel.

Concerning the initial shift feel, the present invention is based on the consideration that quick engine reaction time and abrupt torque transition are the main contributors of the initial bump.

The following approaches have been tested to minimize the driveline shock:
- Immediate off-going clutch release (at shift order): The engine torque falls very quickly and the off-going clutch does not have enough time to exhaust. The hydraulic delay is longer than the engine reaction time. It has been stated that the immediate off-going clutch release at shift initiation does not improve shift feel.
- Smooth off-going clutch pressure range: An open loop off-going pressure ramp does not improve the shift feel either. The initial bump remains even with a smooth off-going pressure ramp down. In summary, this measure delays the shock but does not avoid it.
- Increased Torque Converter Clutch (TCC) slip: This solution takes advantage of slippage between engine and turbine speed to filter driveline shock, but it has major drawback because it affects vehicle drivability, shift dynamics and fuel consumption. Furthermore, tests have proven that this measure does not necessarily improve shift feel.

According to embodiments of the invention, once the first positive torque request is initiated, the torque request is decreasing until a threshold is reached or until the timeout window is reached. The initial shift feel is improved by controlling the engine torque decay at shift order: the engine torque level at the beginning of the gear shift is monitored and managed to get a smooth decrease that reduced the initial bump.

A further feature is that the positive torque requests are initiated if shift and engine speeds are higher than threshold values defined previously for safety reasons.

The function used to request the positive torque becomes active only if shift and engine speeds are higher than thresholds; these thresholds have been defined for safety reasons in order to avoid any push effect while driving in city traffic.

At the beginning of the shift the level of the positive torque is determined based on shift type. Once the actual engine torque becomes equal to the torque request plus an offset, the request is then decreased over the time using a tuneable rate.

Concerning the end feel, it is possible to minimize the end feel push effect by reducing the oncoming capacity up to synchronization time. The experience shows that a good shift feel requests a non-stroken oncoming clutch until the end of ratio change. Then, a pressure rise is commanded at synchronisation to lock up the gear ratio. This strategy shows good results, but leads to an underlap effect.

The measure improves the global shift feel by controlling the engine torque level at synchronization: the engine torque level is maintained to a constant level in order to reduce the amplitude of underlap when the clutch capacity is rising.

The level of the positive torque request is defined as a parameter function of shift type (generally, defined value is around zero Nm). The positive torque request is started once the shift completion ratio variable becomes higher than tuneable value (shift completion ratio is the ratio between actual transmission ratio and init/final gear ratio).

Once the second positive torque request is initiated, it lasts until the synchronization point or until the timeout window is reached.

In the result, the embodiments of the present invention reduce both the initial bump and the amplitude of underlap while avoiding the above-mentioned inconveniences. Premium shift quality on lift foot is provided without shock at the shift initiation and at the end of the shift. At the shift initiation, pressure and engine torque levels are smoothly controlled until release of the clutch. Shift quality becomes independent from engine calibration level as the engine torque level is now managed by the transmission control module. At the end of the shift, engine underlap is minimized. Maintaining the engine torque at almost zero Nm allows a smooth apply of the oncoming clutch.

An automatic transmission with means for initiating a first and a second positive torque request on coast upshift is also within the scope of the invention.

According to a preferred embodiment of the invention, means are provided for controlling that shift and engine speed are higher than threshold values defined previously.

BRIEF DESCRIPTION OF THE DRAWINGS

The present invention will hereinafter be described in conjunction with the following drawing figures, wherein like numerals denote like elements, and:

FIG. 2 and FIG. 3 show the situation according to the present invention.

DETAILED DESCRIPTION

Figure 1:
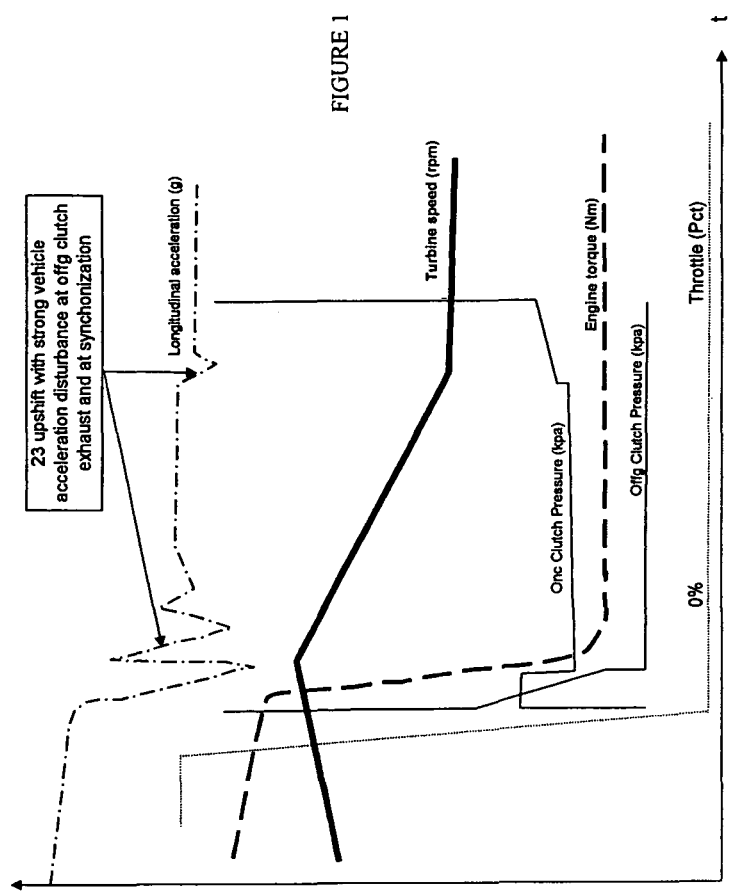
FIG. 1 shows the situation according to the prior art.

The following detailed description is merely exemplary in nature and is not intended to limit application and uses. Furthermore, there is no intention to be bound by any theory presented in the preceding background or summary or the following detailed description.

In all figures are shown the engine torque (in Nm) and the turbine speed (in rpm) over the time.

FIG. 1 is showing the begin and end feel issues as described above: a gear upshift from the second to third gear with strong vehicle acceleration disturbance at offgoing clutch exhaust and firm synchronization. The acceleration, in g, is measured using a longitudinal accelerometer fixed inside the vehicle. The upshift is commanded after pedal lift out (see throttle position signal). Due to this throttle position change, the engine torque level is abruptly decreasing causing poor control at shift initialisation.

The oncoming clutch pressure and the offgoing clutch pressure (both in kpa) are represented over the time: during a coast upshift, the "Offgoing" clutch is released at the shift init and the "On Coming" clutch is applied at synchronization point. A mistiming of the synchronization point and/or an over clutch capacity of the "On Coming" clutch is causing the shift end feel.

As can be seen from FIG. 2 and FIG. 3, two positive torque requests (indicated as "1" and "2") are initiated according to the invention.

FIG. 2 is showing the first torque management request. The torque request is active at the shift initialisation but remains constant until engine torque becomes lower than the request plus an offset (see ΔM offset on the graph). Once this criteria is met, the request is ramping down, forcing the engine torque to follow the desired torque level. The torque request is stopped when its value becomes lower than a tuneable threshold (see "End of torque request" level) or the maximum torque request duration is reached (see "Time out window").

The shift starts with a much smoother engine torque shape, which at least solves the shift control issue.

FIG. 3 shows that a second torque request is commanded so as to render the engine torque at synchronization almost zero. This allows smooth apply of the oncoming clutch (the feature is active between cursor 1 and cursor 2).

The start of the torque request is defined with a parameter based on transmission ratio completion (where completion ratio is a percentage of actual transmission ratio versus initial and final gear ratio—see variable on graph). The level of the torque request is shift type dependant.

Once positive torque request is initiated, it lasts until the synchronization point or until the timeout window is reached.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A method for improving shift quality in an automatic transmission associated with an engine, comprising:
    identifying an coast upshift;
    initiating a first positive torque request upon the identifying of the coast upshift;
    decreasing the first positive torque request over time once an actual engine torque becomes equal to the first positive torque request plus an offset until the first positive torque request is stopped; and
    initiating a second positive torque request upon the identifying of the coast upshift once the first positive torque request is stopped so that the engine torque is maintained at a substantially constant level through synchronization.

2. The method according to claim 1, further comprising initiating the first positive torque request and the second positive torque request if a shift speed is greater than a threshold.

3. The method according to claim 2, further comprising initiating the first positive torque request and the second positive torque request if the shift speed is greater than a second threshold value that is greater than the threshold value.

4. The method according to claim 1, further comprising maintaining the second positive torque request until reaching a synchronization point.

5. The method according to claim 1, further comprising decreasing the first positive torque request until reaching a timeout window.

6. The method according to claim 2, wherein the threshold is a safety threshold.

7. The method according to claim 1, further comprising initiating the first positive torque request and the second positive torque request if an engine speed is greater than a threshold.

8. The method according to claim 7, wherein the threshold is a safety threshold.

9. The method according to claim 7, further comprising initiating the first positive torque request and the second positive torque request if the engine speed is greater than a second threshold value that is greater than the threshold value.

10. The method according to claim 1, further comprising maintaining the second positive torque request until reaching a timeout window.

* * * * *